(12) United States Patent
Ebert (10) Patent No.: US 8,872,643 B2
(45) Date of Patent: Oct. 28, 2014

(54) ENHANCED HEAVY EQUIPMENT PROXIMITY SENSOR

(71) Applicant: William Ebert, Tucson, AZ (US)

(72) Inventor: William Ebert, Tucson, AZ (US)

( * ) Notice: Subject to any disclaimer, the term of this patent is extended or adjusted under 35 U.S.C. 154(b) by 0 days.

(21) Appl. No.: 13/986,415

(22) Filed: Apr. 30, 2013

(65) Prior Publication Data

US 2013/0271274 A1 Oct. 17, 2013

Related U.S. Application Data

(63) Continuation-in-part of application No. 12/925,506, filed on Oct. 23, 2010, now abandoned.

(51) Int. Cl.
*G01V 3/12* (2006.01)

(52) U.S. Cl.
USPC .............................. 340/435; 340/437; 324/329

(58) Field of Classification Search
USPC .......... 340/435, 436, 437; 324/323, 326, 329, 324/345; 37/413, 414, 443; 702/33, 150
See application file for complete search history.

(56) References Cited

U.S. PATENT DOCUMENTS

| | | | |
|---|---|---|---|
| 6,336,077 B1 * | 1/2002 | Boucher | 702/33 |
| 6,970,801 B2 * | 11/2005 | Mann | 702/150 |
| 6,990,390 B2 * | 1/2006 | Groth et al. | 700/180 |
| 7,038,454 B2 * | 5/2006 | Gard et al. | 324/326 |
| 7,516,563 B2 * | 4/2009 | Koch | 37/348 |
| 8,766,639 B2 * | 7/2014 | Branson et al. | 324/329 |
| 2010/0198466 A1 * | 8/2010 | Eklund et al. | 701/50 |
| 2011/0153167 A1 * | 6/2011 | Kahle | 701/50 |

* cited by examiner

*Primary Examiner* — Van T. Trieu
(74) *Attorney, Agent, or Firm* — Mark Ogram (57) ABSTRACT

A safety system for an ore processing facility using a mobile mechanisms such as dozer-type wheeled vehicles operating in proximity with an excavator providing ore to a remote milling site. The excavator or earth moving mechanism has a positioning sensor (such as GPS) generating data indicative of the location of the earth moving mechanism and each of the mobile mechanisms also include positioning sensors. An analysis mechanism receives the positioning sensor data from the earth moving mechanism and the positioning sensor data from said mobile mechanisms and creates a distance calculation which is used alert the alarm in the earth moving mechanism and the alarm in the mobile mechanism if said distance calculation is less than a prescribed value.

19 Claims, 6 Drawing Sheets

ENHANCED HEAVY EQUIPMENT PROXIMITY SENSOR

This is a continuation-in-part of U.S. patent application Ser. No. 12/925,506, filed on Oct. 23, 2010, and entitled "Heavy Equipment Proximity Sensor".

BACKGROUND OF THE INVENTION

This invention relates generally to heavy construction or excavation equipment such as a mining operation and more particularly to sensors to alert the operator of the proximity of another vehicle to prevent collisions.

Operation of heavy equipment is a very dangerous occupation. The machines have a tremendous amount of power and weight; which, when combined, provides for a very unforgiving environment. Major injuries and death are often the result when an operator's attention lapses even for a few seconds.

When heavy equipment operation is combined with a situation where multiple pieces of equipment are working in close proximity to each other with each piece of equipment having their own operator focusing on their own particular task, accidents are bound to happen with terrible results.

This scenario is especially true in mining operations such as an open pit. In these situations, the excavator is excavating ore and depositing it into dump trucks. This requires the excavation mechanism to rotate in its normal operation. This movement though often can cause the excavator to contact one of the "wheeled vehicles" dozer type of mechanisms which must operate in close proximity to the excavator to clear away debris and loose rocks so that the tires of the dump truck are not damaged. Obviously, each operator must focus not only on their own task (excavating for the excavator; clearing the site for the wheeled vehicles) but also in what the other mechanisms are doing.

When the operator of the excavator is given the added task of monitoring the excavator for breakage, the task can become overwhelming. The predominate breakage which may occur is the loss of a tooth and/or an adapter from the excavator dipper itself fails and is lost into the ore being excavated.

The broken tooth with or without the adapter is capable of "jamming" the milling operation and shut the whole process down. Further, to clear the crusher, people must enter the crusherl to remove the jammed tooth which places these people in danger. With the tooth and/or the adapter missing, the dipper can also be damaged.

It is clear there is a need for improved safety relative to heavy equipment.

SUMMARY OF THE INVENTION

The present invention provides for a safety system for an entire ore processing facility together with monitors with alarms to sense unsafe conditions so that the operators are alerted.

In this context, in the fully employed system, three systems operate interactively in a safe environment. These systems are: the excavation mechanism or principal mechanism; the mobile units such as the rubber tired dozers; and the crusher which processes the ore.

Each of the mobile units is controlled by an operator. The mobile unit is equipped with a transmitter well known to those of ordinary skill in the art. Examples of such transmitters are described in: United States Patent publication no. US 2006/0033662 published on Feb. 16, 2006, entitled "Location System" for Ward et al.; United States Patent publication US 2009/0079633 published on Mar. 26, 2009, entitled "Calibration of a Location System" for Ward; U.S. Pat. No. 7,636,062, entitled "Location Device and System Using UWB and Non-UWB Signals" issued to Ward et al. on Dec. 22, 2009; United States Patent publication no. 2010/0001905 published on Jan. 7, 2010, entitled "Location System" for Ward et al.; and, U.S. Pat. No. 7,466,224, entitled "System for Detecting Intruders in a Populated Space" issued to Ward et al. on Dec. 16, 2008; all of which are incorporated hereinto by reference.

In some embodiments, the transmitters are worn by the operator of the mobile units. In this manner, the human operator is also protected even when they are not in the mobile unit. One such application places the transmitters on a pendant which is hung around the neck of the operator.

These transmitters generate a signal at a chosen or prescribed frequency. By using a designated frequency, interference or mis-identification is minimized.

Those of ordinary skill in the art readily recognize techniques to vary the frequency of the transmitters, including, but not limited to: U.S. Pat. No. 7,599,715, entitled "System and Method for Matching Wireless Devices" issued to Himmelstein on Oct. 6, 2009; and United States Patent publication number US 2008/0039023 entitled "Tag Frequency Control" published on Feb. 14, 2008, for Ward; both of which are incorporated hereinto by reference.

An excavation mechanism is the principal mechanism within the assembly. The excavator mechanism is adapted to excavate earth/ore and place it into dump trucks while the mobile mechanism "police" the area to keep the site orderly.

The excavation mechanism includes an array of sensors positioned around it to receive the signals from the transmitters on the mobile devices. These signals are processed and a display within the excavation mechanism identifies where each of the mobile mechanisms is relative to the excavation mechanism. Should a mobile mechanism "move" into a proscribed zone relative to the excavation mechanism, an alarm/warning is sounded within the excavation mechanism to warn its operator.

Those of ordinary skill in the art recognize a variety of mechanisms which monitor transmitters and produce appropriate warnings, including, but not limited to: U.S. Pat. No. 7,586,405, entitled "Motorcycle Awareness System" issued to Brandenburg on Sep. 8, 2009; U.S. Pat. No. 7,592,944, entitled "System and Method for Intrusion Detection Using a Time Domain Radar Array" issued to Fullerton et al. on Sep. 22, 2009; U.S. Pat. No. 7,598,848, entitled "Apparatus and Method of Pedestrian Recognition" issued to Takagi et al. on Oct. 6, 2009; U.S. Pat. No. 7,598,850, entitled "System and Method for Centralized Even Warning Notification for Individual Entities, and Computer Program Product Therefor" issued to Manz on Oct. 6, 2009; and, U.S. Pat. No. 7,603,215, entitled "Lan Keep Control Apparatus and Method for Automotive Vehicle" issued to Matsumoto et al. on Oct. 13, 2009; all of which are incorporated hereinto by reference.

In this context, the earth moving/excavation mechanism has a display which uses a network of sensors positioned on the excavator. The signals from the transmitter on the mobile mechanisms are received by the network of sensors and the locations of the mobile mechanisms relative to the excavator is displayed for the operator of the excavation mechanism to monitor their positions so that collisions can be avoided.

Another embodiment of the invention allows the operator of the excavation mechanism to define a proscribed zone which amounts to a heighten danger field. If a mobile mechanism moves into this proscribed area, an audible alarm, light, or voice telling the operator is sounded and preferably indicating if the danger is in front, left, right, or rear, thereby allowing immediate action to be taken by the operator of the excavation mechanism.

In this embodiment, a further enhancement uses a radio to automatically warn the operator of the mobile mechanisms as well. This is accomplished using a variety of techniques well known to those of ordinary skill in the art, including, but not limited to: U.S. Pat. No. 7,596,391, entitled "System and Method for Wireless Communication Between a Vehicle and a Mobile Unit" issued to Himmelstein on Sep. 29, 2009; and, U.S. Pat. No. 7,603,080, entitled "Multiple Channel Wireless Communication System" issued to Richenstein et al. on Oct. 13, 2009; both of which are incorporated hereinto by reference.

Even further, in the preferred embodiment, transmitters are also planted on the teeth of the excavator mechanism used to excavate the ore. A specified sensor is directed towards the teeth on the excavator's dipper and the presence of the teeth are monitored (via the transmitters). Should a tooth's transmitter not be sensed (indicating that the tooth and/or the adapter associated therewith has been broken from the excavator dipper and placed in one of the dump trucks) an alarm is sounded in the excavation mechanism so that the affected load may be diverted from the crushing operation.

In the preferred embodiment, the sensing tracks if two teeth are not being sensed. This dual "absence" assures that a single faulty or "signal blocked" tooth generating a false positive report does not improperly halt production.

Further, at the remote ore processing mechanism, another sensor monitors the incoming ore loads and monitors for the presence of a transmitter. This provides another layer of protection so that the hardened tooth or adapter does not get into the ore crusher and jam it.

If a tooth is sensed going into the crusher, an alarm is given and the offending tooth is removed or diverted.

Ideally the transmitters on the teeth are communicating on their own frequency so that only the teeth are being sensed.

An enhanced embodiment is a safety system for dozer-type wheeled vehicles operating in proximity with an excavator. In this enhanced embodiment, the excavator or earth moving mechanism has a positioning sensor (such as GPS) generating data indicative of the location of the earth moving mechanism and each of the mobile mechanisms also include positioning sensors.

An analysis mechanism receives the positioning sensor data from the earth moving mechanism and the positioning sensor data from said mobile mechanisms and creates a distance calculation between the earth moving mechanism and each of the mobile mechanism. This distance calculation is used alert the alarm in the earth moving mechanism and the alarm in the identified mobile mechanism if said distance calculation is less than a prescribed value.

In this enhanced embodiment, all of the moving equipment are provided with an alarm so that each operator is able to maintain their own diligence for safety.

In more detail, the enhanced embodiment of the invention involves an earth moving mechanism having its own alarm. The earth moving/excavator also is equipped with a Global Positioning System (GPS) type of positioning sensor. The GPS generates data indicative of the actual location of the earth moving mechanism.

In conjunction, each of the mobile mechanisms or wheeled vehicles contains their own GPS positioning sensor and alarm system. Each GPS on the mobile mechanisms generates data indicative of the actual location of the mobile mechanism.

An analysis mechanism receives the positioning sensor data from the earth moving mechanism and the positioning sensor data from said mobile mechanism and creates a distance calculation for each mobile mechanism. This distance calculation determines if the alarms in the excavator and the alarm in the identified wheeled vehicle should be activated.

In some embodiments, the threshold for activating the alarms based on the distance calculation) is adjustable, allowing control at the site.

The invention, together with various embodiments thereof will be more fully explained by the accompanying drawings and the following descriptions thereof.

DRAWINGS IN DETAIL

Figure 1:
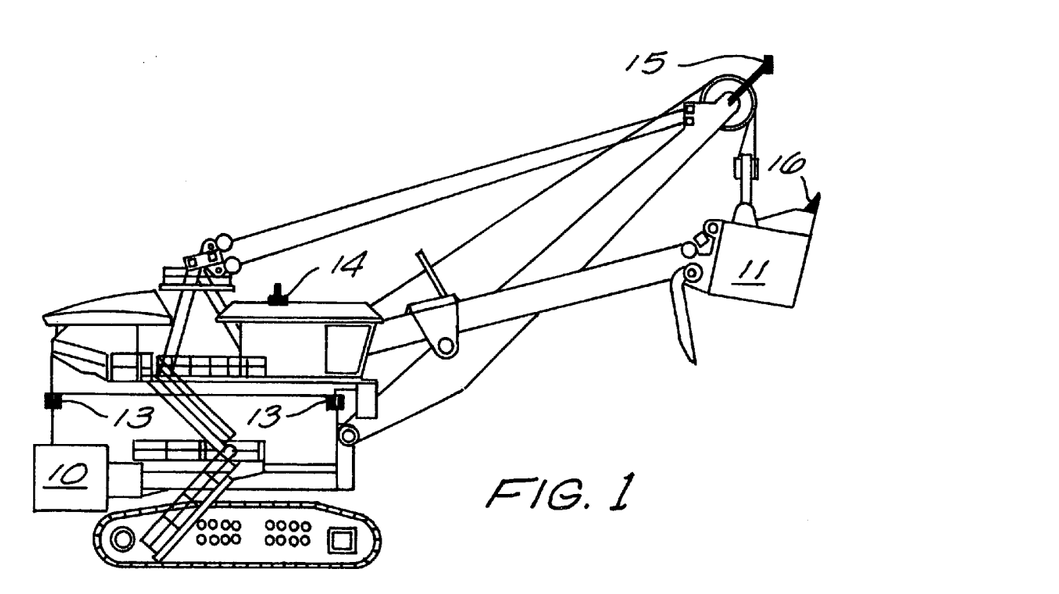
FIG. 1 illustrates an excavation mechanism with the preferred embodiment's array of sensors.

FIG. 1 illustrates an excavation mechanism with the preferred embodiment's array of sensors.

Excavator 10 is used for the excavation of ore and uses dipper 11 which removes ore to be placed into a dump truck (not shown). To assist in the excavation process, dipper 11 uses a number of teeth 16 which rip into the ore face.

Excavator mechanism 10 is a massive mechanism which requires great concentration by its operator. To monitor nearby mechanisms and personnel, sensors 13 are arranged around excavator 10 to locate the transmitters and then plot and monitor the transmitter's movement relative to excavator 10.

Further, in some embodiments of the invention, excavator 10 uses radio transmission via antenna 14 to warn nearby vehicles/personnel of a sensed dangerous situation.

In another embodiment of the invention, sensor 15 is directed towards tooth 16 which includes a transmitter embedded therein. If a transmission is not present (indicating that tooth 16 is missing from dipper 11), as noted by sensor 15, a computer or microprocessor (not shown) alerts the operator so that the loose tooth or adaptor is prevented from entering the crushing operation and jamming the equipment therein.

Figure 2:
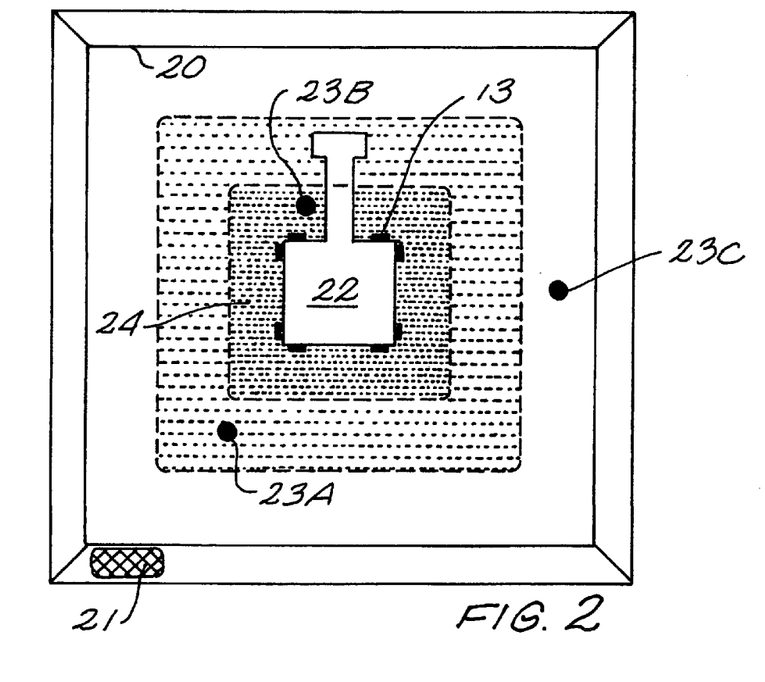
FIG. 2 illustrates the monitor which is mounted within the cab of the excavator.

FIG. 2 illustrates the monitor which is mounted within the cab of the evacuator mechanism.

Monitor 20 shows a stationary stylized excavator 22. The various other vehicles or personnel 23A, 23B, and 23C, are shown on monitor 20. A danger zone 24 is represented on the screen so that if a mobile mechanism 23B enters the danger zone 24, an alarm or voice is sounded via speaker 21. In some embodiments, speaker 21 is remotely located.

In another embodiment, a warning flashes the symbol for mobile mechanism 23B in a red or highlighted color on the display.

Note, movement in this context is all relative to excavator 22. As example, mobile mechanism 23B may be stationary on the ground, but, as excavator 22 "swings" around, there will be relative motion between the two objects and it will appear that mobile mechanism 23B is "moving" into the danger zone 24 when in reality the danger zone 24 is being swept toward mobile mechanism 23B.

In this manner, the operator of excavator 22 is warned of dangerous situations and can take remedial actions.

Figure 3:
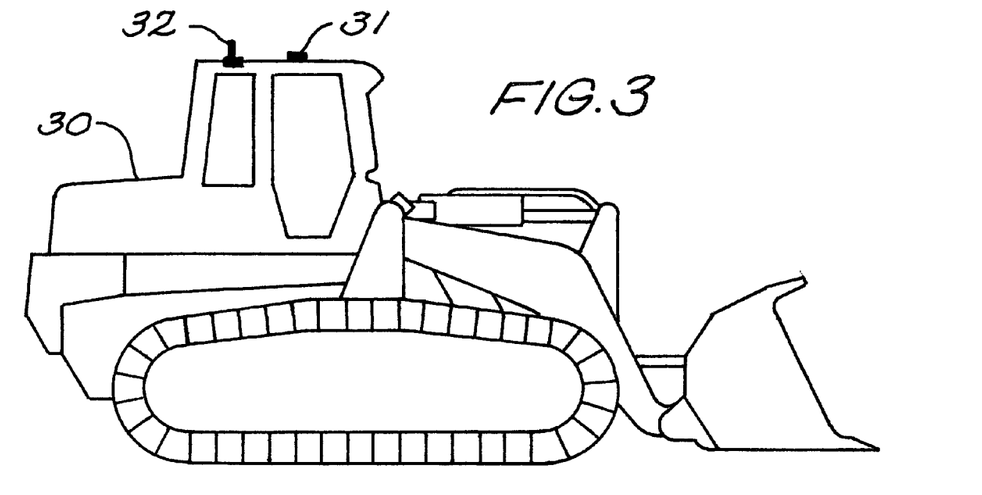
FIG. 3 illustrates a wheeled vehicle equipped with a transmitter and a receiving radio for alarms from the excavator mechanism.

FIG. 3 illustrates a track vehicle equipped with a transmitter and a receiving radio for alarms from the evacuator mechanism. The illustration shows a track vehicle but the invention is not to be limited thereby; the invention also includes wheeled vehicles.

Mobile mechanism 30 is equipped with a transmitter 31 (mounted on the cab of the vehicle in this illustration). It is transmitter 31 which is picked up and monitored by the sensors on the excavator as described earlier.

Note, while this illustration shows a dozer-type of mechanism, the invention is not so limited but includes other mobile mechanisms well known to those of ordinary skill in the art, including, but not limited to pickup trucks.

Figure 4:
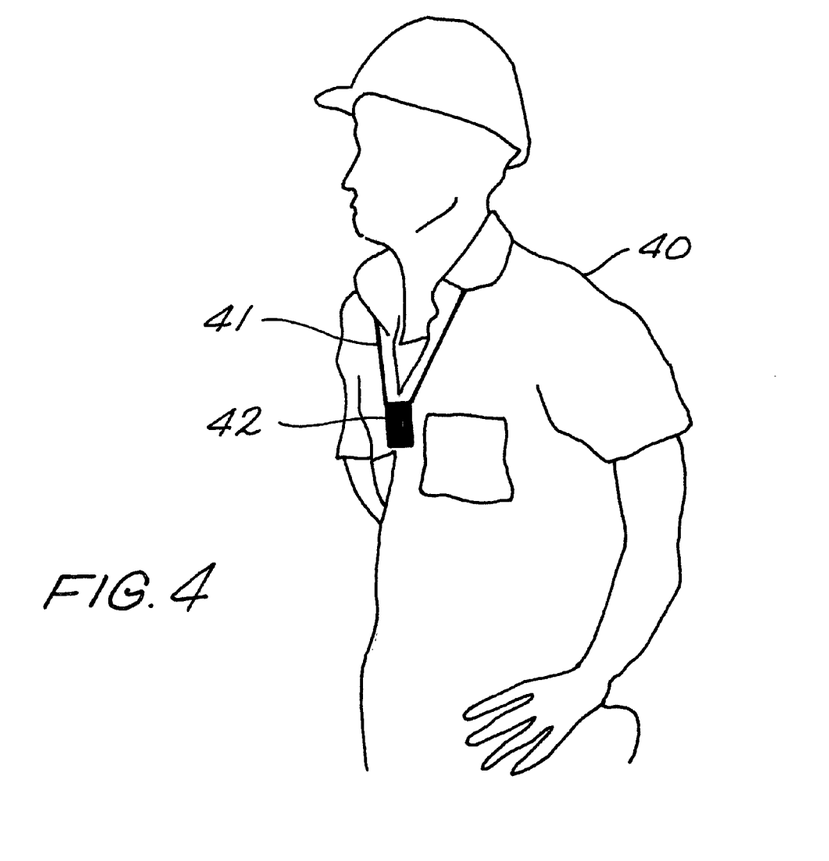
FIG. 4 illustrates a safety mechanism for an individual.

In the preferred embodiment, should mobile mechanism 30 enter a danger zone relative to the excavation mechanism, then a radio warning is transmitted by the excavation mechanism. This radio warning is picked up by the mobile mechanism 30 via antenna 32 and the operator of the mobile mechanism 30 is alerted so that a collision can be avoided FIG. 4 illustrates a safety mechanism for an individual.

User 40 has transmitter/radio receiver 42 secured around his neck using lanyard 41. Other embodiments use a clip on mechanism for the belt for the placement of the transmitter/radio receiver 42. Those of ordinary skill in the art recognize a variety of other attachment mechanisms which can be used in this context.

In this embodiment, should user 40 enter into the danger zone as described above (whether user 40 is operating the mobile mechanism or is walking), the excavation mechanism, sensing user 40's presence, alerts user 40 via a radio transmission which sounds on transmitter/radio receiver 42. In some embodiments, excavation is halted during an alarm situation.

This embodiment is useful because it allows individuals to be protected when near the excavator mechanism and also eliminates the need to modify the mobile mechanisms when the operator wears this safety mechanism.

Figure 5:
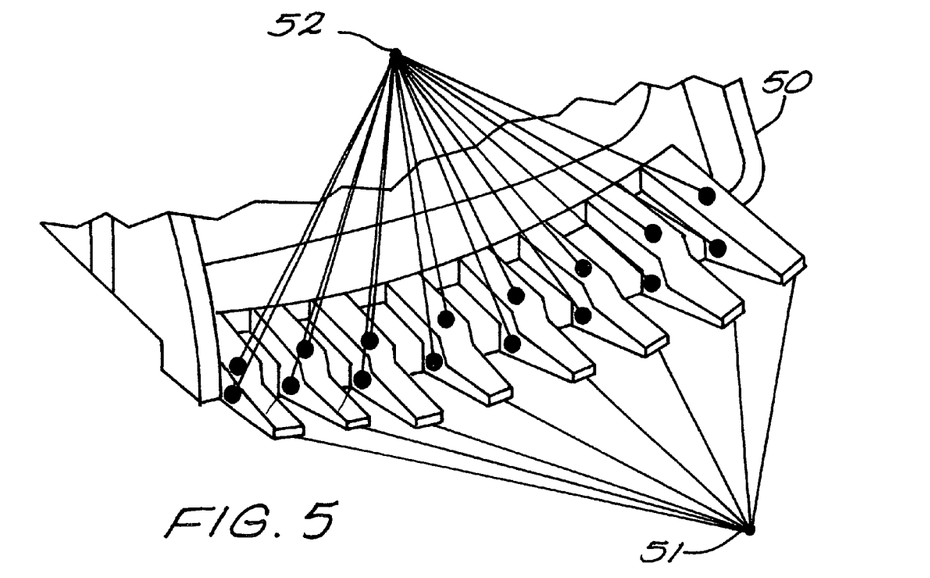
FIG. 5 illustrates the excavator dipper with teeth/adapters of the excavation mechanism having transmitters therein.

FIG. 5 is a top view of an excavator bucket and illustrates the bucket with teeth/adapters having transmitters therein.

Scoop 50 has teeth 51 secured thereon using adapters 52. In this illustration, each tooth 51 is equipped with two transmitters 52; other embodiments employ a single transmitter and still others employ more than two transmitters. These transmitters 52 are monitored as outlined earlier to determine if a tooth and/or adapter has been broken from the bucket.

The teeth are made of such hardened metal that a broken tooth can easily jam the crusher used to crush the ore.

To minimize "false positives", the ideal mechanism only alerts the operator when at least two teeth are reported missing. In this way, should a tooth's transmitter be malfunctioning or blocked from transmission, then the operation is not halted without cause.

Figure 6:
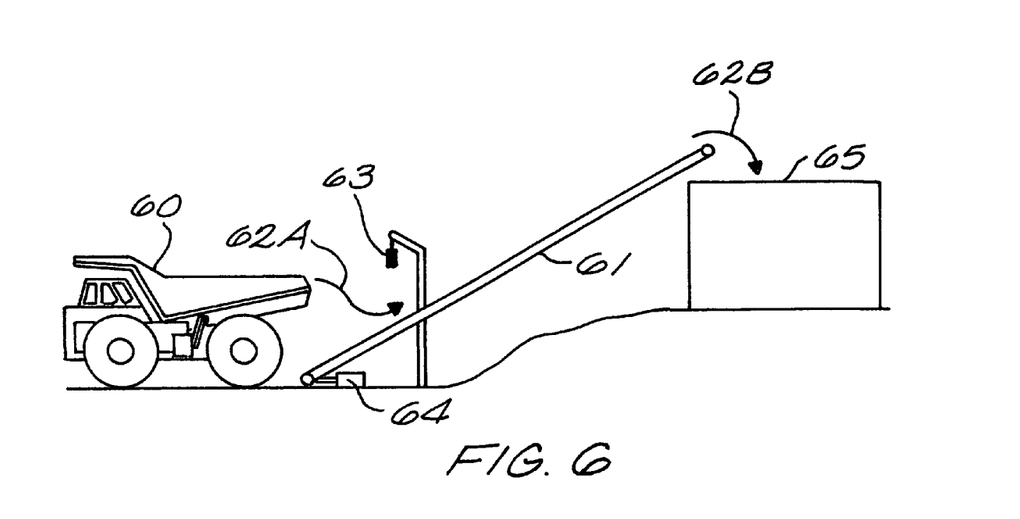
FIG. 6 shows the monitoring at the crusher location for any broken teeth/adapters.

FIG. 6 shows the monitoring at the mill location for any broken teeth/adapters

In a typical mining operation, dump truck 60 deposits the ore as indicated by arrow 62A onto conveyor belt 61 which is powered by motor 64. The deposited ore is transported by conveyor belt 61 to the crusher or mill 65 as illustrated by arrow 62B.

Ideally, during transportation of the ore by conveyor belt 61, sensor 63 monitors for the existence of a transmitter as outlined in FIG. 5, being attached to a broken tooth. If this transmitter is sensed by sensor 63, motor 64 is stopped and the tooth is found and removed from the ore on conveyor belt 61. This prevents the broken tooth from entering and jamming the crushing operation.

In a different embodiment, an alarm is sounded to alert the operator of the mill of the tooth's existence within the ore on conveyor belt 61.

In yet another embodiment, when the existence of the tooth is made, a diversion of the ore is made to a debris field where the broken tooth can be removed at a later time; thereby allowing crusher 65 and the conveyor belt 61 to continue operation.

Figure 7:
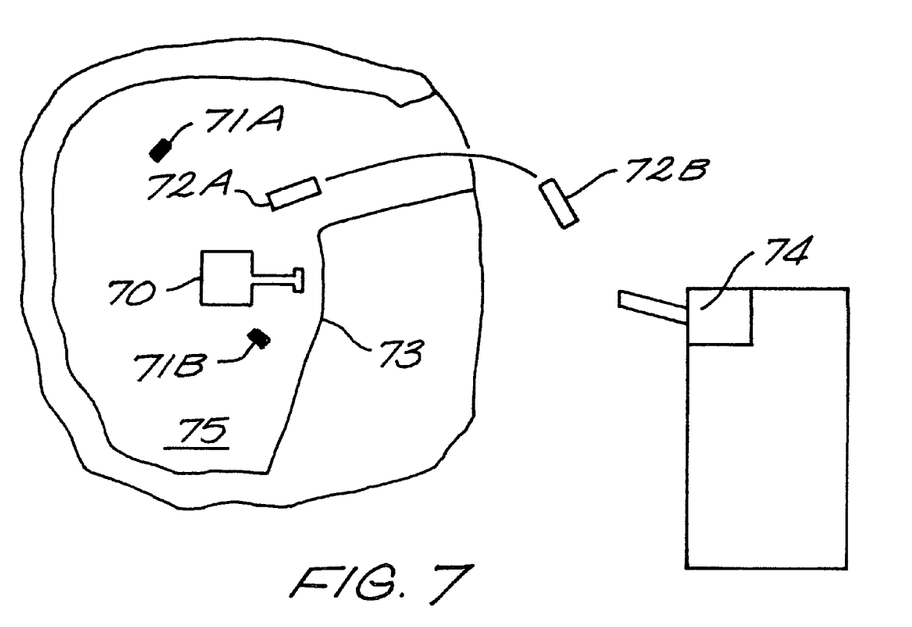
FIG. 7 is a system diagram showing the overall safety system of the preferred embodiment.

FIG. 7 is a system diagram showing the overall safety system of the preferred embodiment.

In this complete safety system, excavation mechanism 70 removes ore from an excavation face 73 within excavation pit 75. Ore from excavation mechanism 70 is deposited into dump truck 72A and transported to crusher 74 as illustrated by dump truck 72B.

Wheeled vehicles 71A and 71B operate around the excavation mechanism 70 to keep the area debris free so that dump trucks' tires 72A and 72B are not damaged by fallen rocks.

Using the transmitters and sensors as outlined above, wheeled vehicles 71A and 71B are monitored by excavation mechanism 70 for safety and crusher 74 monitors the ore being delivered by dump trucks 72A and 72B for broken teeth or adaptors from excavation mechanism 70.

In this manner, the entire system is provided protection from damage both to the operators and also to the mechanisms involved.

Figure 8:
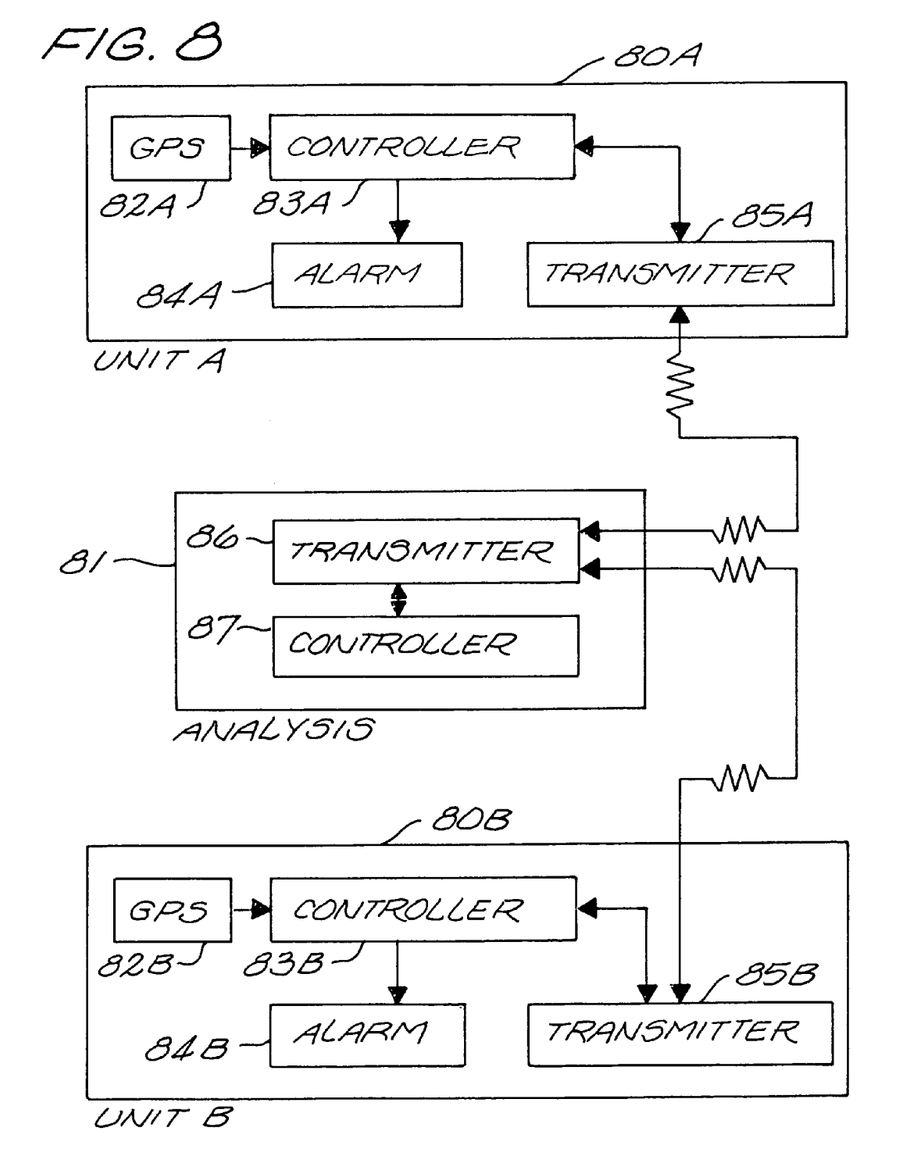
FIG. 8 is a block diagram illustrating the operation of an embodiment of the invention which utilizes the Global Positioning System (GPS).

FIG. 8 is a block diagram illustrating the operation of an embodiment of the invention which utilizes the Global Positioning System (GPS).

In this illustration, for simplicity of illustration, two units (A and B) are illustrated. Each unit, 80A and 80B, are located on a mechanism where safety is sought.

Position Unit A 80A and Positioning Unit B 80B are identical in structure. Each unit includes a GPS 82A and 82B receiver which generates data indicative of the location of the Unit. By placing or securing Unit A 82A to the earth moving mechanism such as a scoop, the location of the scoop/earth moving mechanism is constantly monitored and reported to controller 83A.

Likewise, by placing or securing unit B 82B to the mobile mechanism such as the wheeled vehicle, the location of the wheeled vehicle is monitored and reported to controller 83B.

Each controller 83A and 83B reports their respective locations to the analysis mechanism 81 via transmitter/receivers 85A and 85B respectively. This reporting is done via radio waves and is received by the analysis mechanism 81 via its transmitter/receiver 86.

Transmitter/receiver 86 reports the data being received to controller 87 which calculates the absolute distance between Unit A 80A (the earth moving mechanism) and Unit B 80B (the wheeled vehicle). If this distance is less than a prescribed distance, then controller 87 sends out an alert signal via transmitter 86 to transmitters 85A and transmitter 85B which in turn communicate this alert signal to their respective controllers 83A and 83B.

Controllers 83A and 83B then sound alarms 84A and 84B to alert the respective operators that they are within a "danger zone" and to be additionally cautious.

In the preferred embodiment, the alarm is a red light indicating the direction where the "danger" exists. Other alarms are obvious to those of ordinary skill in the art and include audio alarms and flashing lights.

Note that should there be other units in the field for additional vehicles, only the vehicles which are in the "danger zone" are alerted.

Analysis mechanism 81, in the preferred embodiment, is mounted to the earth moving mechanism; in other embodiments, the analysis mechanism is secured to one of the wheeled vehicles; in yet another embodiment, the analysis mechanism is secured at a permanent position such as a building used to support the operation.

In this manner, the location of all of the affected machinery is monitored and the operators of the machinery are alerted when they are dangerously close to each other.

Figure 9:
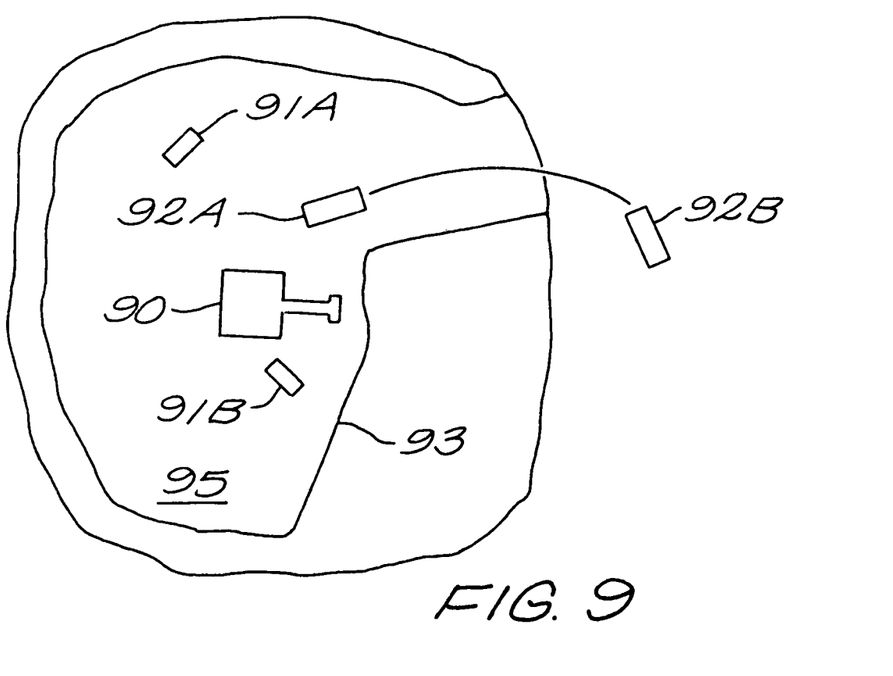
FIG. 9 is a top view of the GPS embodiment illustrating how the alarms are used to assure safety.

FIG. 9 is a top view of the GPS embodiment illustrating how the alarms are used to assure safety.

In this illustration, wheeled vehicles 91A and 91B are equipped with the positioning units described in FIG. 8. Additionally, a positioning unit is on scoop 90 (the earth moving mechanism). Trucks 92A and 92B are ideally also equipped with the positioning units.

As the various mechanisms move around the excavation site 95, their positions are determined and reported to the analysis mechanism (not shown but ideally mounted on scoop 90). When wheeled vehicle 90B is proximate to scoop 90, then an alert is sounded in both scoop 90 and the wheeled vehicle 91B; but, at the same time, no alert is sounded in wheeled vehicle 91A which is not within the "danger zone".

In this way, the various pieces of equipment within the excavation site 95 are able to move in completing their task and only be alerted when added caution is warranted.

It is clear that the present invention provides for a highly improved safety system ideally suited for heavy equipment.

What is claimed is:

1. A vehicle proximity alert system comprising:
   a) an earth moving mechanism having,
      1) A positioning sensor generating data indicative of the a location of the earth moving mechanism, and,
      2) an alarm;
   b) a mobile mechanism adapted to be used near said earth moving mechanism, said mobile mechanisms having,
      1) a positioning sensor generating data indicative of the location of the mobile mechanism; and,
      2) an alarm; and,
   c) an analysis mechanism adapted to:
      1) receive the positioning sensor data from the earth moving mechanism and the positioning sensor data from said mobile mechanism and create therefrom a distance calculation; and,
      2) alert the alarm in the earth moving mechanism and the alarm in the mobile mechanism if said distance calculation is less than a prescribed value.

2. The vehicle proximity alert system according to claim 1, wherein the positioning sensor of the earth moving mechanism and the positioning sensor of the mobile mechanism both employ Global Positioning System technology.

3. The vehicle proximity alert system according to claim 2, wherein said analysis mechanism is located on the earth moving mechanism.

4. The vehicle proximity alert system according to claim 3, wherein there are more than one mobile mechanisms and wherein said analysis mechanism communicates with all of the mobile mechanisms.

5. The vehicle proximity alert system according to claim 2, wherein said analysis mechanism is located on the mobile mechanism.

6. The vehicle proximity alert system according to claim 2, wherein said earth moving mechanism includes:
   a) a scoop with teeth thereon, each of said teeth having at least one transmitter transmitting a signal; and,
   b) a presence sensor directed towards said scoop and receiving signals from said transmitters in the at least seven teeth, said presence sensor activating said alarm in the earth moving mechanism if a signal from at least two transmitters is not received by the presence sensor.

7. The vehicle proximity alert system according to claim 6, wherein said presence sensor operates at predetermined intervals.

8. A vehicle proximity alert system comprising:
   a) an earth moving mechanism having, a positioning sensor generating data indicative of the a location of the earth moving mechanism, and,
   b) a mobile mechanism adapted to be used near said earth moving mechanism, said mobile mechanisms having a positioning sensor generating data indicative of the location of the mobile mechanism; and,
   c) an analysis mechanism adapted to:
      1) receive the positioning sensor data from the earth moving mechanism and the positioning sensor data from said mobile mechanism and create therefrom a distance calculation; and,
      2) alert a user of the earth moving mechanism and a user of the mobile mechanism if said distance calculation is less than a prescribed value.

9. The vehicle proximity alert system according to claim 8, wherein the positioning sensor of the earth moving mechanism and the positioning sensor of the mobile mechanism both employ Global Positioning System technology.

10. The vehicle proximity alert system according to claim 9, wherein said analysis mechanism is located on the earth moving mechanism.

11. The vehicle proximity alert system according to claim 9, wherein said analysis mechanism is located on the mobile mechanism.

12. The vehicle proximity alert system according to claim 9, wherein said mobile mechanism and the earth moving mechanism each contain an analysis mechanism.

13. The vehicle proximity alert system according to claim 12, wherein said earth moving mechanism includes:
   a) a scoop with teeth thereon, each of said teeth having at least one transmitter transmitting a signal; and,
   b) a presence sensor directed towards said scoop and receiving signals from said transmitters in the at least seven teeth, said presence sensor activating said alarm in the earth moving mechanism if a signal from a single transmitter is not received by the presence sensor.

14. The vehicle proximity alert system according to claim 13, wherein said presence sensor operates at predetermined intervals.

15. An excavation system comprising:
   a) an earth moving mechanism having an alarm and,
      1) a scoop with teeth thereon, each of said teeth having at least one transmitter transmitting a signal,
      2) a presence sensor directed towards said scoop and receiving signals from said transmitters in the teeth, said presence sensor activating said alarm in the earth moving mechanism if a signal from at least two transmitters is not received by the presence sensor, and, 3) a positioning sensor generating data indicative of the a location of the earth moving mechanism;

b) a mobile mechanism adapted to be used near said earth moving mechanism, said mobile mechanisms having an alarm and a positioning sensor generating data indicative of the location of the mobile mechanism; and, c) an analysis mechanism adapted to:

1) receive the positioning sensor data from the earth moving mechanism and the positioning sensor data from said mobile mechanism and create therefrom a distance calculation; and, 2) alert the alarm in the earth moving mechanism and the alarm in the mobile mechanism if said distance calculation is less than a prescribed value.

16. The excavation system according to claim 15, wherein the positioning sensor of the earth moving mechanism and the positioning sensor of the mobile mechanism both employ Global Positioning System technology.

17. The excavation system according to claim 16, wherein said analysis mechanism is located on the earth moving mechanism.

18. The excavation system according to claim 17, wherein there are more than one mobile mechanisms and wherein said analysis mechanism communicates with all of the mobile mechanisms.

19. The excavation system according to claim 16, wherein said analysis mechanism is located on the mobile mechanism.

\* \* \* \* \*